United States Patent
Wang et al.

(10) Patent No.: US 11,355,932 B2
(45) Date of Patent: Jun. 7, 2022

(54) CONTROL SYSTEM AND CONTROL METHOD FOR PARALLEL CONVERTER SYSTEM

(71) Applicants: NR Electric Co., Ltd, Jiangsu (CN); NR Engineering Co., Ltd, Jiangsu (CN)

(72) Inventors: Nannan Wang, Jiangsu (CN); Yu Lu, Jiangsu (CN); Yunlong Dong, Jiangsu (CN); Jie Tian, Jiangsu (CN); Chongxue Jiang, Jiangsu (CN); Jiacheng Wang, Jiangsu (CN); Gang Li, Jiangsu (CN); Jiudong Ding, Jiangsu (CN); Haiying Li, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 187 days.

(21) Appl. No.: 16/644,225

(22) PCT Filed: May 22, 2018

(86) PCT No.: PCT/CN2018/087796
§ 371 (c)(1),
(2) Date: Mar. 4, 2020

(87) PCT Pub. No.: WO2019/047559
PCT Pub. Date: Mar. 14, 2019

(65) Prior Publication Data
US 2020/0212674 A1    Jul. 2, 2020

(30) Foreign Application Priority Data
Sep. 5, 2017 (CN) .......................... 201710788447.3

(51) Int. Cl.
*H02J 3/12* (2006.01)
*H02J 3/36* (2006.01)
*H02J 3/46* (2006.01)

(52) U.S. Cl.
CPC .................. *H02J 3/12* (2013.01); *H02J 3/36* (2013.01); *H02J 3/46* (2013.01)

(58) Field of Classification Search
CPC ........ H02J 3/12; H02J 3/36; H02J 3/46; H02J 3/48; H02J 3/50; H02J 3/381; H02J 3/388; Y02E 60/60
See application file for complete search history.

(56) References Cited

U.S. PATENT DOCUMENTS

| 6,445,600 B2 | 9/2002 | Ben-Yaakov |
| 2008/0211464 A1* | 9/2008 | Ponnaluri ............. H02M 7/493 323/207 |

(Continued)

FOREIGN PATENT DOCUMENTS

| CN | 103730908 A | 4/2014 |
| CN | 103904676 A | 7/2014 |

(Continued)

OTHER PUBLICATIONS

Int'l Search Report dated Aug. 27, 2018 in Int'l Application No. PCT/CN2018/087796.

(Continued)

*Primary Examiner* — Ziaul Karim
(74) *Attorney, Agent, or Firm* — Panitch Schwarze Belisario & Nadel LLP

(57) ABSTRACT

Disclosed are a control method and system for a parallel converter system, including a common AC voltage controller and a separate current controller for each converter; the AC voltage controller generates an active current, a wattless current, and a system voltage phase reference value and, by (Continued)

means of communication, sends same to the current controller of each converter in island control mode to be a converter control signal; the active and wattless current outputted by each converter, along with the corresponding current reference value, accomplish the objective of the parallel converter system collectively controlling the amplitude and frequency of an AC bus voltage. The method and system are highly reliable and effectively ensure the synchronization of a plurality of converters.

10 Claims, 2 Drawing Sheets

(56) References Cited

U.S. PATENT DOCUMENTS

| | | | | |
|---|---|---|---|---|
| 2014/0191582 | A1* | 7/2014 | Deboy | H02M 7/48 307/82 |
| 2015/0015072 | A1* | 1/2015 | Deboy | H02M 7/48 307/52 |
| 2015/0069844 | A1* | 3/2015 | Wu | H02J 3/32 307/74 |
| 2017/0005473 | A1* | 1/2017 | Somani | H02J 3/381 |

FOREIGN PATENT DOCUMENTS

| | | |
|---|---|---|
| CN | 107565589 A | 1/2018 |
| DE | 102012003309 A1 | 8/2013 |
| JP | S61224831 A | 10/1986 |
| JP | 2001025171 A | 1/2001 |
| JP | 2002272124 A | 9/2002 |
| RU | 2490777 C1 | 8/2013 |

OTHER PUBLICATIONS

Office Action dated May 16, 2019 in CN Application No. 201710788447.3.
Decision to Grant dated Oct. 27, 2020 in Russian Application No. 2020111496/07.
Decision to Grant dated Jun. 11, 2021 in Japanese Patent Application No. 2020-513649.
Hassanzahraee et al. "Transient Droop Control Strategy for Parallel Operation of Voltage Source Converters in an Islanded Mode Microgrid", Telecommunications Energy Conference, pp. Oct. 1-9, 2011.
Milczarek et al., "Proportional Reactive Power Sharing Algorithm in Islanded AC Microgrid", First Workshop on Smart Grid and Renewable Energy, IEEE, pp. 1-6, Mar. 22, 2015.
Office Action dated Jun. 30, 2021 in European Application No. 18854241.9.

* cited by examiner

CONTROL SYSTEM AND CONTROL METHOD FOR PARALLEL CONVERTER SYSTEM

CROSS-REFERENCE TO RELATED APPLICATIONS

This application is a Section 371 of International Application No. PCT/CN2018/087796, filed May 22, 2018, which was published in the Chinese language on Mar. 14, 2019, under International Publication No. WO 2019/047559 A1, which claims priority under 35 U.S.C. § 119(b) to Chinese Application No. 201710788447.3, filed Sep. 5, 2017, the disclosures of which are incorporated herein by reference in their entirety.

TECHNICAL FIELD

The invention relates to the technical field of flexible DC transmission of power systems, in particular to a control system and control method for a parallel converter system.

BACKGROUND

The flexible DC transmission technology can fulfill large-scale new-energy grid connection more effectively, and can guarantee efficient collection, flexible transmission, decentralization and consumption of new energy. When the new energy is collected by high-voltage large-capacity flexible DC systems, from the perspective of reliability improvements, a plurality of converters is generally connected in parallel, so that after one converter is broken down, other converters can transfer parts power to reduce power losses. A bipolar topology is commonly adopted, and the converters are connected in parallel to the same AC bus or to connected AC buses through a voltage source converter.

When the flexible DC grid is accessed to new-energy island systems, the converters should supply stable AC voltage to island networks, and at this moment, the total power of the flexible DC systems is determined by the new-energy island systems. When a plurality of converters is connected in parallel to the island systems containing the new energy, in addition to the supply of stable AC voltage to the island networks, coordinated control over the plurality of converters, such as balanced power transmission or power transmission in a preset proportion by the plurality of converters in normal conditions, and the limitation on the maximum power of the converters when the converters are overloaded should also be taken into consideration.

In order to realize outward transmissions of large-capacity new energy through a plurality of parallel converters by means of island access, an island control method and system for the plurality of parallel converters need to be adopted to fulfill coordinated control over the plurality of converters.

SUMMARY

The objective of the invention is to provide an island control method and system for a parallel converter system. In the method, a common AC voltage controller generates a current control reference signal of a plurality of converters to realize the AC voltage control of an island power grid and the power distribution and limitation of the plurality of parallel converters.

The technical solution adopted by the invention to fulfill the above-mentioned objective is as follows:

The control method for a parallel converter system is characterized in that the parallel converter system comprises at least two parallel voltage source converters connected in parallel to the same AC bus or to connected AC buses, at least one of the converters operating in an island control mode; and the control method comprises the following steps:

(1) Calculating a system voltage phase reference value $\theta_{ref}$ according to a frequency reference value $F_{ref}$;

(2) Acquiring a bus voltage across the AC bus;

(3) Processing the acquired bus voltage to obtain an active current reference value $I_{dref}$ and a wattless current reference value $I_{qref}$, which are exclusively determined by an effective bus voltage reference value and the system voltage phase reference value $\theta_{ref}$;

(4) Outputting the active current reference value $I_{dref}$, the wattless current reference value $I_{qref}$, and the system voltage phase reference value $\theta_{ref}$, served as converter control signal, to each converter in island control mode; and (5) Controlling an active current of any converter in the island control modes to follow the active current reference value $I_{dref}$ and controlling a wattless current of any converter in the island control modes to follow the wattless current reference value $I_{qref}$ according to the received control signal; and The converters in the island control modes aim to control the amplitude and frequency of the voltage of the AC bus.

According to the control method for a parallel converter system, the frequency reference value $F_{ref}$ is a rated system frequency $F_n$ or meets $F_{ref}=F_n+K_f(P_{ref}-P)$, wherein $K_f$ is a proportionality coefficient ranging from −100 to 100, $P_{ref}$ is a total active power reference value of the parallel converters, and P is actual total active power of the parallel converters.

According to the control method for a parallel converter system, before the converter control signal is outputted to the $i^{th}$ converter in the island control mode in Step (4), the active current reference value $I_{dref}$ is multiplied by an active power distribution coefficient $K_{di}$ to obtain an active current reference value $I_{drefi}$ of the $i^{th}$ converter in the island control mode, and the wattless current reference value $I_{qref}$ is multiplied by a wattless power distribution coefficient $K_{qi}$ to obtain a wattless current reference value $I_{qrefi}$ of the $i^{th}$ converter in the island control mode, wherein $0 \le K_{di} \le 1$, $0 \le K_{qi} \le 1$, i range from 1 to the number of the converters in the island control modes, and the active power distribution coefficients $K_d$ or the wattless power distribution coefficients $K_q$ of the converters are identical or different from each other.

According to the control method for a parallel converter system, current vector control is adopted for any converter in the island control modes in Step (5).

According to the control method for a parallel converter system, when active power of any converter needs to be limited, the active current reference value is limited to be less than or equal to an active current limit value $I_{dlim}$; and when wattless power of any converter needs to be limited, the wattless current reference value is limited to be less than or equal to a wattless current limit value $I_{qlim}$;

The active current limit value $I_{dlim}$ is generated through one of the following two solutions:

(i) The active current limit value $I_{dlim}$ is a preset value ranging from 0 to the maximum active current of the converters;

(ii) The active current limit value $I_{dlim}$ is generated by modulating a deviation between an active power limit value and actual active power of the converters through a PI controller;

The wattless current limit value $I_{qlim}$ is generated through one of the following two solutions:

(i) The wattless current limit value $I_{qlim}$ is a preset value ranging from 0 to the maximum wattless current of the converters; and (ii) The wattless current limit value $I_{qlim}$ is generated by modulating a deviation between a wattless power limit value and actual wattless power of the converters through a PI controller.

The control system for a parallel converter system is characterized in that the parallel converter system comprises at least two parallel voltage source converters connected in parallel to the same AC bus or to connected AC buses, the control system comprises a common AC voltage controller and a separate current controller for each converter, and the AC voltage controller conducts the following stages:

A reference phase generating stage: a system voltage phase reference value $\theta_{ref}$ is calculated according to a frequency reference value $F_{ref}$;

An AC voltage sampling stage: a bus voltage across the AC bus is acquired;

A current reference value calculating stage: the acquired bus voltage is processed to obtain an active current reference value $I_{dref}$ and a wattless current reference value $I_{qref}$ which are exclusively determined by an effective bus voltage reference value and the system voltage phase reference value $\theta_{ref}$; wherein:

The AC voltage controller outputs the active current reference value $I_{dref}$, the wattless current reference value $I_{qref}$, and the system voltage phase reference value $\theta_{ref}$, served as converter control signal, to the current controller of each converter in island control mode by means of communication, to make an active current outputted by the converter follow the active current reference value $I_{dref}$ and a wattless current outputted by each converter follow the wattless current reference value $I_{qref}$.

The AC voltage controller is configured through one of the following two solutions:

(i) The AC voltage controller and the current controllers of the converters are configured in the same control device;

(ii) The AC voltage controller and the current controllers of the converters are configured in different control devices; and When AC voltage controllers are configured in a plurality of control devices, at same time the current controllers of all the converters merely adopt the converter control signal outputted by one of the AC voltage controllers according to a preset priority.

According to the control system for a parallel converter system, the AC voltage controller is a proportional-integral controller, a sliding mode controller, a dead-beat controller, or a non-linear controller, and the current controllers are selected from proportional-integral controllers, sliding mode controllers, dead-beat controllers, or non-linear controllers.

According to the control system for a parallel converter system, the AC voltage controller further comprises a power distribution stage: the active current reference value $I_{dref}$ is multiplied by an active power distribution coefficient $K_{di}$ to obtain an active current reference value $I_{drefi}$ of the $i^{th}$ converter in the island control mode, and the wattless current reference value $I_{qref}$ is multiplied by a wattless power distribution coefficient $K_{qi}$ to obtain a wattless current reference value $I_{qrefi}$ of the $i^{th}$ converter in the island control mode, wherein $0 \leq K_{di} \leq 1$, $0 \leq K_{qi} \leq 1$, i ranges from 1 to the number of the converters of the island control modes, and the active power distribution coefficients $K_d$ or the wattless power distribution coefficients $K_q$ of the converters are identical or different from each other.

According to the control system for a parallel converter system, the current controller of the converter comprises a power limitation stage: the active current reference value is limited to be less than or equal to an active current limit value $I_{dlim}$, and the wattless current reference value is limited to be less than or equal to a wattless current limit value $I_{qlim}$;

The active current limit value $I_{dlim}$ is generated through one of the following two solutions:

(i) The active current limit value $I_{dlim}$ is a preset value ranging from 0 to the maximum active current of the converters;

(ii) The active current limit value $I_{dlim}$ is generated by modulating a deviation between an active power limit value and actual active power of the converters through a PI controller;

The wattless current limit value $I_{qlim}$ is generated through one of the following two solutions:

(i) The wattless current limit value $I_{qlim}$ is a preset value ranging from 0 to the maximum wattless current of the converters; and (ii) The wattless current limit value $I_{qlim}$ is generated by modulating a deviation between a wattless power limit value and actual wattless power of the converters through a PI controller.

According to the control system for a parallel converter system, when the AC voltage controller and the current controllers are configured in the same control device, a reference signal is transmitted via a backplane bus; and when the AC voltage controller and the current controllers are configured in different devices, the communication is by means of a standard protocol which is an IEC60044-8 protocol, an Ethernet protocol, or a TDM protocol.

By adoption of the above solution, the invention has the following beneficial effects:

(1) According to the control method and system for a parallel converter system of the invention, through the cooperation of the upper AC voltage controller and a plurality of lower current controllers of the converters to fulfill functional decoupling, so that the object-oriented design requirements are met, and the reliability is high.

(2) According to the control method and system for a parallel converter system of the invention, a system voltage phase is generated by the common upper AC voltage controller, so that the synchronization of a plurality of converters is effectively guaranteed.

(3) The control method and system for a parallel converter system of the invention has the capacity to distribute the power of the parallel converters, so that the power of the plurality of parallel converters can be controlled to be balanced or unbalanced as needed.

(4) According to the control method and system for a parallel converter system of the invention, a power limitation function is fulfilled, so that a sent instruction is prevented from exceeding the power limit of the converters.

(5) According to the control method and system for a parallel converter system of the invention, the power limitation function is fulfilled by limiting a current instruction, and after the current instruction is limited during an AC fault, the converters are turned to adopt a constant current control, so that the fault ride-through of an AC system is realized.

DETAILED DESCRIPTION OF EMBODIMENTS

The technical solution of the invention is expounded below in combination with the accompanying drawings and embodiments.

Figure 1:
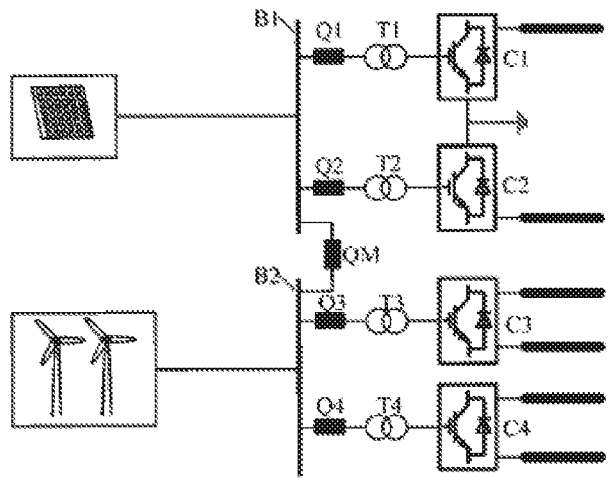
FIG. 1 is a schematic diagram of a parallel converter system including four converters.

FIG. 1 shows a schematic diagram of a parallel converter system including four converters. The parallel converter system comprises four parallel converters, namely a converter C1, a converter C2, a converter C3, and a converter C4, wherein the converter C1 is connected to an AC bus B1 through a converter transformer T1 and an incoming switch Q1, the converter C2 is connected to the AC bus B1 through a converter transformer T2 and an incoming switch Q2, the converter C3 is connected to an AC bus B2 through a converter transformer T3 and an incoming switch Q3, and the converter C4 is connected to the AC bus B2 through a converter transformer T4 and an incoming switch Q4; the AC bus 131 is connected to the AC bus B2 through a bus-bar switch QM; and the AC bus B1 and the AC bus B2 are both connected to an island AC system including a new-energy power generation system.

Figure 2:
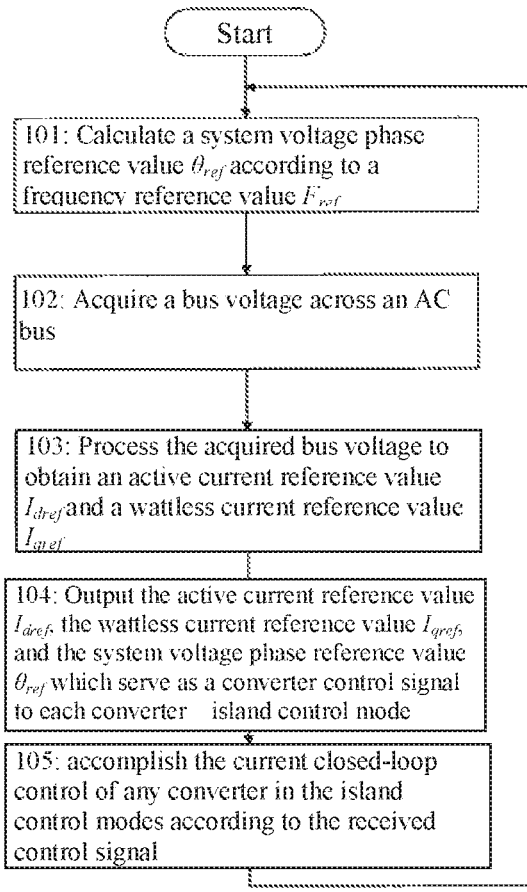
FIG. 2 is a flow diagram of a control method for the parallel converter system.

FIG. 2 shows a flow diagram of a control method for the parallel converter system. To keep the AC voltage amplitude and frequency of the island AC systems stable, the AC bus to which the parallel connectors are connected is controlled through the following steps:

101: A system voltage phase reference value $\theta_{ref}$ is calculated according to a frequency reference value $F_{ref}$. In a preferred implementation, $\theta_{ref}(t)=\theta_{ref}(t-\Delta t)+2\pi F_{ref}\Delta t$, wherein $\theta_{ref}(t)$ is a system voltage phase reference value at the current moment, and $\theta_{ref}(t-\Delta t)$ is a system voltage phase reference value before interval control by a $\Delta t$ cycle and is set as 0 initially; and $F_{ref}$ is valued in two approaches which are respectively as follows:

(i) $F_{ref}$ is a rated system frequency $F_n$ such as 50 HZ; and (ii) $F_{ref}$ meets $F_{ref}=F_n+K_f(P_{ref}-P)$, wherein $K_f$ is a proportionality coefficient, which is appropriately selected from −100 to 100 according to an actual system, $P_{ref}$ is a total active power reference value of the parallel converters, and P is actual total active power of the parallel converters.

102: A bus voltage across the AC bus is acquired. In a preferred implementation, a three-phase bus voltage across the AC bus is acquired and is subject to park transformation according to the system voltage phase reference value $\theta_{ref}$ to obtain a bus voltage d-axis component $U_{sd}$ and a bus voltage q-axis component $U_{sq}$.

103: The acquired bus voltage is processed to obtain an active current reference value $I_{dref}$ and a wattless current reference value $I_{qref}$. In a preferred implementation, a deviation between the bus voltage d-axis component $U_{sd}$ and an effective bus voltage reference value is modulated by a PI controller to generate the active current reference value $I_{dref}$, a deviation between the bus voltage q-axis component $U_{sq}$ and 0 is modulated by a PI controller to generate the wattless current reference value $I_{qref}$, so that the active current reference value $I_{dref}$ and the wattless current reference value $I_{qref}$ are actually exclusively determined by the effective bus voltage reference value and the system voltage phase reference value $\theta_{ref}$ determining d-axis and q-axis angles.

104: The active current reference value $I_{dref}$, the wattless current reference value $I_{qref}$, and the system voltage phase reference value $\theta_{ref}$, served as a converter control signal, are outputted to each converter in island control mode. When a power distribution function is required to distribute power of a plurality of converters, for converters having the output power required to be reduced, the active current reference value $I_{dref}$ is multiplied by a power distribution coefficient less than 1. For instance, when the active power of the $i^{th}$ converter in the island control mode is expected to be 0.5 of that of other converters and wattless power of the $i^{th}$ converter in the island control mode is expected to be 0.6 of that of other converters, the active current reference value $I_{dref}$ sent to the $i^{th}$ convener in the island control mode is multiplied by an active power distribution coefficient $K_{di}=0.5$ to obtain an active current reference value $I_{drefi}$ of the $i^{th}$ converter in the island control mode, and the wattless current reference value $I_{qref}$ is multiplied by a wattless power distribution coefficient $K_{qi}=0.6$ to obtain a wattless current reference value $I_{qrefi}$ of the $i^{th}$ converter in the island control mode; and the active power distribution coefficient and the wattless power distribution coefficient of other converters are 1. Particularly, when the active power distribution coefficient and the wattless power distribution coefficient of all the converters in the island control modes are 1, the power of the converters is balanced in operation.

105: According to the received control signal, an active current of any converter in the island control mode is controlled to follow the active current reference value $I_{dref}$, and a wattless current of any converter in the island control mode is controlled to follow the wattless current reference value $I_{qref}$. When the active power of any converter in the island control modes needs to be limited, the active current reference value is limited to be less than or equal to an active current limit value $I_{dlim}$, that is, the active current reference value is in the range of $[-I_{dlim}, I_{dlim}]$; and when the wattless power of any converter in the island control modes needs to be limited, the wattless current reference value is limited to be less than or equal to a wattless current limit value $I_{qlim}$, that is, the wattless current reference value is in the range of $[-I_{qlim}, I_{qlim}]$. The active current limit value $I_{dlim}$ is generated through one of the following two solutions:

(i) The active current limit value $I_{dlim}$ is a preset value, such as the maximum active current of the converters;

(ii) The active current limit value $I_{dlim}$ is generated by modulating a deviation between an active power limit value such as the maximum overloading active power and actual active power of the converters through a PI controller;

The wattless current limit value $I_{qlim}$ is generated through one of the following two solutions:

(i) The wattless current limit value $I_{qlim}$ is a preset value, such as the maximum wattless current of the converters; and (ii) The wattless current limit value $I_{qlim}$ is generated by modulating a deviation between a wattless power limit value such as the maximum wattless power limited by a power range and actual wattless power of the converters through a PI controller.

In the case where converters which do not adopt the island control modes and the converters which adopt the same island control modes are connected in parallel to the same bus, active power control or DC voltage control is adopted for active control, and wattless power control is adopted for wattless control.

Figure 3:
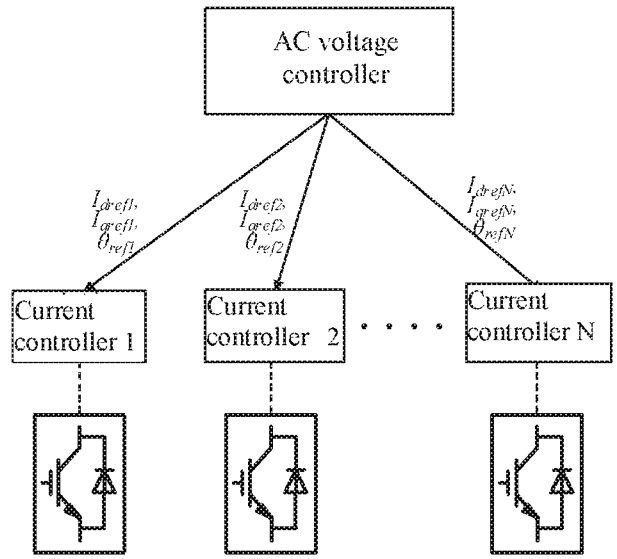
FIG. 3 is a structural view of a control system for the parallel converter system.

FIG. 3 shows a structural view of a control system for a parallel converter system. The control system comprises a common AC voltage controller and current controllers 1–N, wherein N is the number of converters in island control modes in the parallel converter system; the current controller i is a controller of the $i^{th}$ converter in the island control mode, i is selected from 1 to N, and the current controllers are independent of one another. The AC voltage controller and any current controller are configured in different control devices, and a control signal, including an active current reference value $I_{dref}$, a wattless current reference value $I_{qref}$, and a system voltage phase reference value $\theta_{ref}$, of the $i^{th}$ converter is sent to the current controller i of the corresponding converter by means of communication through a standard protocol. The AC voltage controller and the current controllers can be configured in the same control device. Or a plurality of AC voltage controllers are configured in a plurality of control devices, and if this is the case, a switching logic should be set to guarantee that the current controllers of all the converters merely adopt the converter control signal outputted by one of the AC voltage controllers at a same time according to a preset priority.

Figure 4:
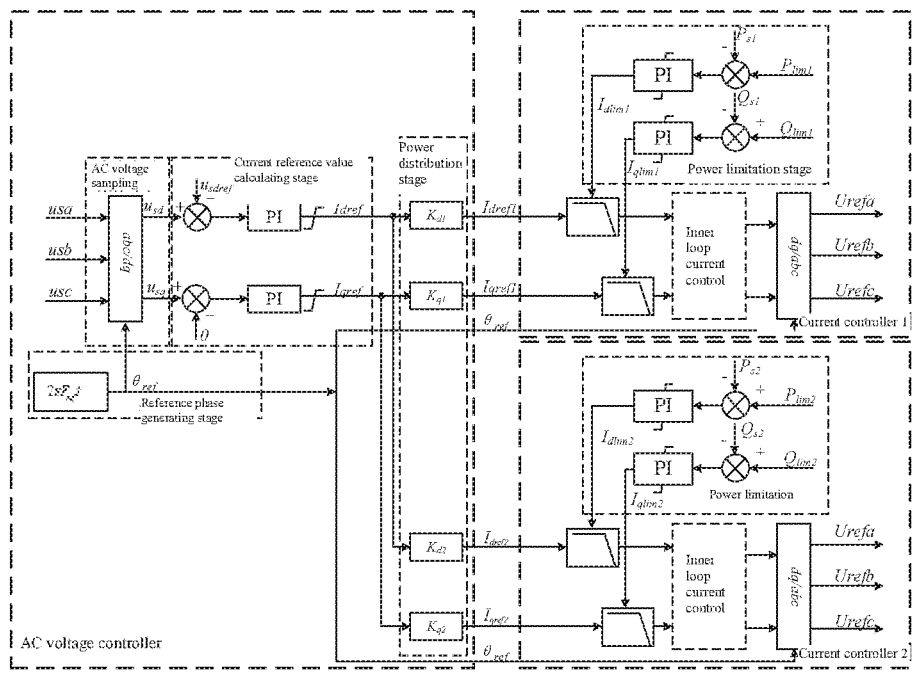
FIG. 4 is a block diagram illustrating the control function of a parallel converter system including two converters.

FIG. 4 shows a block diagram illustrating the control function of a parallel converter system including two converters. An AC voltage controller comprises a reference phase generation stage, an AC voltage sampling stage, a current reference value calculating stage, and a power distribution stage, wherein in the reference phase generating stage, a system voltage phase reference value $\theta_{ref}$ is calculated according to a frequency reference value $F_{ref}$, in the AC voltage sampling stage, and a three-phase bus voltage across the AC bus is acquired and is subject to park transformation according to the system voltage phase reference value $\theta_{ref}$ to obtain a bus voltage d-axis component $U_{sd}$ and a bus voltage q-axis component $U_{sq}$; in the current reference value calculating stage, a deviation between the bus voltage d-axis component $U_{sd}$ and an effective bus voltage reference value is modulated by a PI controller to generate an active current reference value $I_{dref}$, a deviation between the bus voltage q-axis component $U_{sq}$ and 0 is modulated by a PI controller to generate a wattless current reference value $I_{qref}$, and a sliding mode controller, a dead-beat controller, or a nonlinear controller may be adopted; in the power distribution stage, with regard to the $1^{st}$ converter in the island control mode, the active current reference value $I_{dref}$ is multiplied by an active power distribution coefficient $K_{d1}$ to obtain an active current reference value $I_{dref1}$, and the wattless current reference value $I_{qref}$ is multiplied by a wattless power distribution coefficient $K_{q1}$ to obtain a wattless current reference value $I_{qref1}$; with regard to the $2^{nd}$ converter in the island control mode, the active current reference value $I_{dref}$ is multiplied by an active power distribution coefficient $K_{d2}$ to obtain an active current reference value $I_{dref2}$, and the wattless current reference value $I_{qref}$ is multiplied by a wattless power distribution coefficient $K_{d2}$ to obtain a wattless current reference value $I_{qref2}$, wherein, $0 \leq K_{d1} \leq 1$, $0 \leq K_{q1} \leq 1$, $0 \leq K_{d2} \leq 1$, and $0 \leq K_{q2} \leq 1$, and when the two converters operate symmetrically, $K_{d1}=K_{q1}=K_{d2}=K_{q2}=1$; and in this case, it is equivalent to no configuration of the power distribution stage. Corresponding current controllers, namely a current controller 1 and a current controller 2, are configured for the two converters, and the power limitation stage is configured for the two current controllers. With regard to the $i^{th}$ converter (i=1 or 2), an active current limit value $I_{dlimi}$ is generated by modulating a deviation between the maximum overloading active power $P_{limi}$ and actual active power $P_{si}$ through a PI controller, and a wattless current limit value $I_{qlimi}$ is generated by modulating a deviation between the maximum wattless power $Q_{limi}$ and actual wattless power $Q_{si}$ through a PI controller; and an active current reference value $I_{dref}$ is defined as a boundary value when out of the range of $[-I_{dlimi}, I_{dlimi}]$, and a wattless current reference value $I_{qref}$ is defined as a boundary value when out of the range of $[-I_{qlimi}, I_{qlimi}]$. Vector control is adopted for inner loop current control of the converters, and the $i^{th}$ converter is controlled according to active and wattless current instructions outputted in the power limitation stage and the system voltage phase reference value $\theta_{ref}$.

The above embodiments are only used for explaining the technical idea of the invention, and are not intended to limit the protection scope of the invention. All changes made on the basis of the technical solution according to the technical idea put forward by the invention should also fall within the protection scope of the invention.

What is claimed is:

1. A control method for a parallel converter system, the parallel converter system comprising at least two parallel voltage source converters connected in parallel to a same AC bus or to connected AC buses, at least one of the converters operating in an island control mode, and the control method comprising the following steps:
   (1) calculating a system voltage phase reference value $\theta_{ref}$ according to a frequency reference value $F_{ref}$;
   (2) acquiring a bus voltage across the AC bus;
   (3) processing the acquired bus voltage to obtain an active current reference value $I_{dref}$ and a wattless current reference value $I_{qref}$ which are determined by an effective bus voltage reference value and the system voltage phase reference value $\theta_{ref}$;
   (4) outputting the active current reference value $I_{dref}$, the wattless current reference value $I_{qref}$, and the system voltage phase reference value $\theta_{ref}$ served as a converter control signal, to each converter in said island control mode; and
   (5) controlling an active current of the converter in the island control mode to follow the active current reference value $I_{dref}$ and controlling a wattless current of the converter in the island control mode to follow the wattless current reference value $I_{qref}$ according to the received control signal;
   wherein the converter in the island control mode aim to control an amplitude and frequency of the voltage of the AC bus.

2. The control method for a parallel converter system according to claim 1, wherein the frequency reference value $F_{ref}$ is a rated system frequency $F_n$ or meets $F_{ref}=F_n+K_f(P_{ref}-P)$, where $K_f$ is a proportionality coefficient ranging from –100 to 100, $P_{ref}$ is a total active power reference value of the parallel converters, and P is actual total active power of the parallel converters.

3. The control method for a parallel converter system according to claim 1, wherein before the converter control signal is outputted to an $i^{th}$ converter in the island control mode in Step (4), the active current reference value $I_{dref}$ is multiplied by an active power distribution coefficient $K_{di}$ to obtain an active current reference value $I_{drefi}$ of the $i^{th}$ converter in the island control mode, and the wattless current reference value $I_{qref}$ is multiplied by a wattless power distribution coefficient $K_{qi}$ to obtain a wattless current reference value $I_{qrefi}$ of the $i^{th}$ converter in the island control mode, where $0 \leq K_{di} \leq 1$, $0 \leq K_{qi} \leq 1$, i ranges from 1 to a number of the converters in the island control mode, and the active power distribution coefficients $K_d$ or the wattless power distribution coefficients $K_q$ of the converters are identical or different from each other.

4. The control method for a parallel converter system according to claim 1, wherein current vector control is adopted for the converter in the island control mode in Step (5).

5. The control method for a parallel converter system according to claim 1, wherein when active power of the converter needs to be limited, the active current reference value is limited to be less than or equal to an active current limit value $I_{dlim}$; and when wattless power of the converter needs to be limited, the wattless current reference value is limited to be less than or equal to a wattless current limit value $I_{qlim}$;

the active current limit value $I_{dlim}$ is generated through one of the following two solutions:
 (i) the active current limit value $I_{dlim}$ is a preset value ranging from 0 to a maximum active current of the converter;
 (ii) the active current limit value $I_{dlim}$ is generated by modulating a deviation between an active power limit value and actual active power of the converter through a proportional-integral controller;

the wattless current limit value $I_{qlim}$ is generated through one of the following two solutions:
 (i) the wattless current limit value $I_{qlim}$ is a preset value ranging from 0 to a maximum wattless current of the converter; and
 (ii) the wattless current limit value $I_{qlim}$ is generated by modulating a deviation between a wattless power limit value and actual wattless power of the converter through a proportional-integral controller.

6. A control system for a parallel converter system, the parallel converter system comprising at least two parallel voltage source converters connected in parallel to a same AC bus or to connected AC buses, the control system comprising a common AC voltage controller and a current controller having separate converters, and the AC voltage controller conducting the following stages:

a reference phase generating stage: a system voltage phase reference value $\theta_{ref}$ is calculated according to a frequency reference value $F_{ref}$;

an AC voltage sampling stage: a bus voltage across the AC bus is acquired;

a current reference value calculating stage: the acquired bus voltage is processed to obtain an active current reference value $I_{dref}$ and a wattless current reference value $I_{qref}$ which are exclusively determined by an effective bus voltage reference value and the system voltage phase reference value $\theta_{ref}$; wherein:

the AC voltage controller outputs the active current reference value $I_{dref}$, the wattless current reference value $I_{qref}$, and the system voltage phase reference value $\theta_{ref}$, searved as a converter control signal, to the current controller of each converter in said island control mode by means of communication, to make an active current outputted by each converter to follow the active current reference value $I_{dref}$ and make a wattless current outputted by each converter to follow the wattless current reference value $I_{qref}$;

the AC voltage controller is configured through one of the following two solutions:
 (i) the AC voltage controller and the current controllers of the converters are configured in a same control device;
 (ii) the AC voltage controller and the current controllers of the converters are configured in different control devices; and when AC voltage controllers are configured in a plurality of control devices, the current controllers of all the converters adopt the converter control signal outputted by only one of the AC voltage controllers at a same time according to a preset priority.

7. The control system for a parallel converter system according to claim 6, wherein the AC voltage controller is a proportional-integral controller, a sliding mode controller, a dead-beat controller, or a non-linear controller, and the current controllers are selected from proportional-integral controllers, sliding mode controllers, dead-beat controllers, or non-linear controllers.

8. The control system for a parallel converter system according to claim 6, wherein the AC voltage controller further comprises a power distribution stage: for an $i^{th}$ converter in the island control mode, the active current reference value $I_{dref}$ is multiplied by an active power distribution coefficient $K_{di}$ to obtain an active current reference value $I_{drefi}$ of the $i^{th}$ converter in the island control mode, and the wattless current reference value $I_{qref}$ is multiplied by a wattless power distribution coefficient $K_{qi}$ to obtain a wattless current reference value $I_{qrefi}$ of the $i^{th}$ converter in the island control mode, where $0 \leq K_{di} \leq 1$, $0 \leq K_{qi} \leq 1$, i ranges from 1 to a number of the converters in the island control mode, and the active power distribution coefficients $K_d$ or the wattless power distribution coefficients $K_q$ of the converters are identical or different from each other.

9. The control system for a parallel converter system according to claim 6, wherein the current controller of said converter comprises a power limitation stage: the active current reference value is limited to be less than or equal to an active current limit value $I_{dlim}$, and the wattless current reference value is limited to be less than or equal to a wattless current limit value $I_{qlim}$;

the active current limit value $I_{dlim}$ is generated through one of the following two solutions:
 (i) the active current limit value $I_{dlim}$ is a preset value ranging from 0 to a maximum active current of the converter;
 (ii) the active current limit value $I_{dlim}$ is generated by modulating a deviation between an active power limit value and actual active power of the converter through a proportional-integral controller;

the wattless current limit value $I_{qlim}$ is generated through one of the following two solutions:
 (i) the wattless current limit value $I_{qlim}$ is a preset value ranging from 0 to a maximum wattless current of the converter; and
 (ii) the wattless current limit value $I_{qlim}$ is generated by modulating a deviation between a wattless power limit value and actual wattless power of the converter through a proportional-integral controller.

10. The control system for a parallel converter system according to claim 6, wherein when the AC voltage controller and the current controllers are configured in a same control device, a reference signal is transmitted via a backplane bus; and when the AC voltage controller and the current controllers are configured in different devices, communication is by means of a standard protocol which is an IEC60044-8 protocol, an Ethernet protocol, or a TDM protocol.

* * * * *